(12) United States Patent
Shih

(10) Patent No.: US 6,982,858 B2
(45) Date of Patent: Jan. 3, 2006

(54) ELECTRONIC POWER-SAVING POWER CONTROL CIRCUIT

(75) Inventor: Te-Fu Shih, Taichung (TW)

(73) Assignee: Digitek Technology Co., Ltd., Taipei Hsien (TW)

( * ) Notice: Subject to any disclaimer, the term of this patent is extended or adjusted under 35 U.S.C. 154(b) by 241 days.

(21) Appl. No.: 10/424,805

(22) Filed: Apr. 29, 2003

(65) Prior Publication Data

US 2004/0218325 A1    Nov. 4, 2004

(51) Int. Cl.
*H02H 3/00*    (2006.01)
(52) U.S. Cl. ........................ 361/93.1; 323/905
(58) Field of Classification Search ........... 361/93.1; 323/237, 905
See application file for complete search history.

(56) References Cited

U.S. PATENT DOCUMENTS

| | | | |
|---|---|---|---|
| 5,327,048 A * | 7/1994 | Troy | 315/240 |
| 5,583,423 A * | 12/1996 | Bangerter | 323/239 |
| 6,175,220 B1 * | 1/2001 | Billig et al. | 323/239 |
| 6,191,563 B1 * | 2/2001 | Bangerter | 323/211 |
| 2001/0030514 A1 * | 10/2001 | Takahashi et al. | 315/219 |
| 2004/0002792 A1 * | 1/2004 | Hoffknecht | 700/295 |

* cited by examiner

*Primary Examiner*—Ronald Leja
(74) *Attorney, Agent, or Firm*—Rosenberg, Klein & Lee

(57) ABSTRACT

An electronic power-saving power control circuit for connection between a single-phase power supply and a lighting fixture to control the output of power supply to the lighting fixture is disclosed to include a CPU (central processing unit), a power voltage detector, a silicon controlled semiconductor circuit, a current phase detector, a trigger circuit, a resistor, a current detector, and a DC power supply circuit. The electronic power-saving power control circuit saves the consumption of power supply by dropping the voltage without affecting normal working of the lighting fixture at the load and, achieves an overcurrent protection.

4 Claims, 2 Drawing Sheets

ELECTRONIC POWER-SAVING POWER CONTROL CIRCUIT

BACKGROUND OF THE INVENTION

1. Field of the Invention

The present invention relates to a power-saving power control circuit for use to control the output of power supply to a lighting fixture and, more particularly, to an electronic power-saving power control circuit, which saves the consumption of power supply by dropping the voltage without affecting normal working of the lighting fixture at the load.

2. Description of the Related Art

Because the load of a lighting fixture, for example, a fluorescent lamp, is fixed, the design and installation of a lighting fixture are done subject to the nominal voltage of the power system, allowing the lighting fixture to function normally within a tolerance about ±5~10% of the nominal voltage. The installation and brightness of a lighting fixture must be set subject to the voltage level below the nominal voltage but higher than the lowest level of the tolerance. The power consumption of an inductance ballast fluorescent lamp or the like has a direct concern with voltage level. The higher the voltage is the greater the consumption will be. Therefore, reducing the voltage to a lever closer to the lower limit of the tolerance greatly saves power consumption without affecting normal functioning of the load.

Various power-saving voltage stabilizers have been disclosed. These voltage stabilizers commonly use a voltage regulator to increase or reduce voltage, providing a stable voltage output to the load. However, these conventional designs are still not satisfactory in function because of the following drawbacks.

1. In order to fit high current, the voltage regulator is heavy, bulky and expensive, not economic for a small power system. Further, it is difficult to regulate the voltage to a suitable range. Excessive high drop of voltage causes the equipment at the load not able to function normally. Insufficient drop of voltage cannot achieve a significant saving of power consumption.
2. The voltage regulators of conventional power-saving voltage stabilizers cannot automatically and freely regulate voltage dropping. They drop the voltage step by step. The range between two steps may be too far, resulting in an unstable functioning of the load or insignificant saving of power consumption.
3. These conventional power-saving voltage stabilizers do not fit all equipment.

Further, power-saving designs using silicon controlled semiconductor to control output power to motor drives are well known. It is known that a motor drive consumes much energy than desired when the load is low. Using a silicon controlled semiconductor to control output power saves much energy. The saving of energy may be achieved by two methods, i.e., the variable voltage dropping and the fixed voltage dropping. According to the variable voltage dropping method, the dropping of output power and the range of energy saving vary with the change of the load, i.e., the output voltage varies with the voltage of power source and the load. According to the fixed voltage dropping method, the dropping of voltage is fixed subject to fixed input power voltage and fixed load, i.e., the output voltage varies with the input voltage. These two methods cannot be employed to lighting fixtures.

SUMMARY OF THE INVENTION

The present invention has been accomplished under the circumstances in view. According to one aspect of the present invention, the electronic power-saving power control circuit is connected between a single-phase power supply and a lighting fixture for controlling the output of power supply to the lighting fixture, comprised of a CPU (central processing unit), a power voltage detector, a silicon controlled semiconductor circuit, a current phase detector, a trigger circuit, a resistor, a current detector, and a DC power supply circuit. According to another aspect of the present invention, the electronic power-saving power control circuit obtains the necessary working voltage from the power supply connected to the lighting fixture, therefore no independent power supply is necessary for the electronic power-saving power control circuit. According to still another aspect of the present invention, the relationship between the triggering angle and the voltage drop is not linearity. According to still another aspect of the present invention, the triggering angle (voltage drop) is defined within a limited range subject to the nominal voltage and the features of the lighting fixture. According to still another aspect of the present invention, the current detection circuit detects the level of the electric current subject to the voltage drop at the resistor, so that the CPU drives the silicon controlled semiconductor circuit to stop power supply from the lighting fixture when the level of the electric current detected by the current detection circuit surpassed the nominal current, achieving an overcurrent protection.

DETAILED DESCRIPTION OF THE PREFERRED EMBODIMENT

Figure 1:
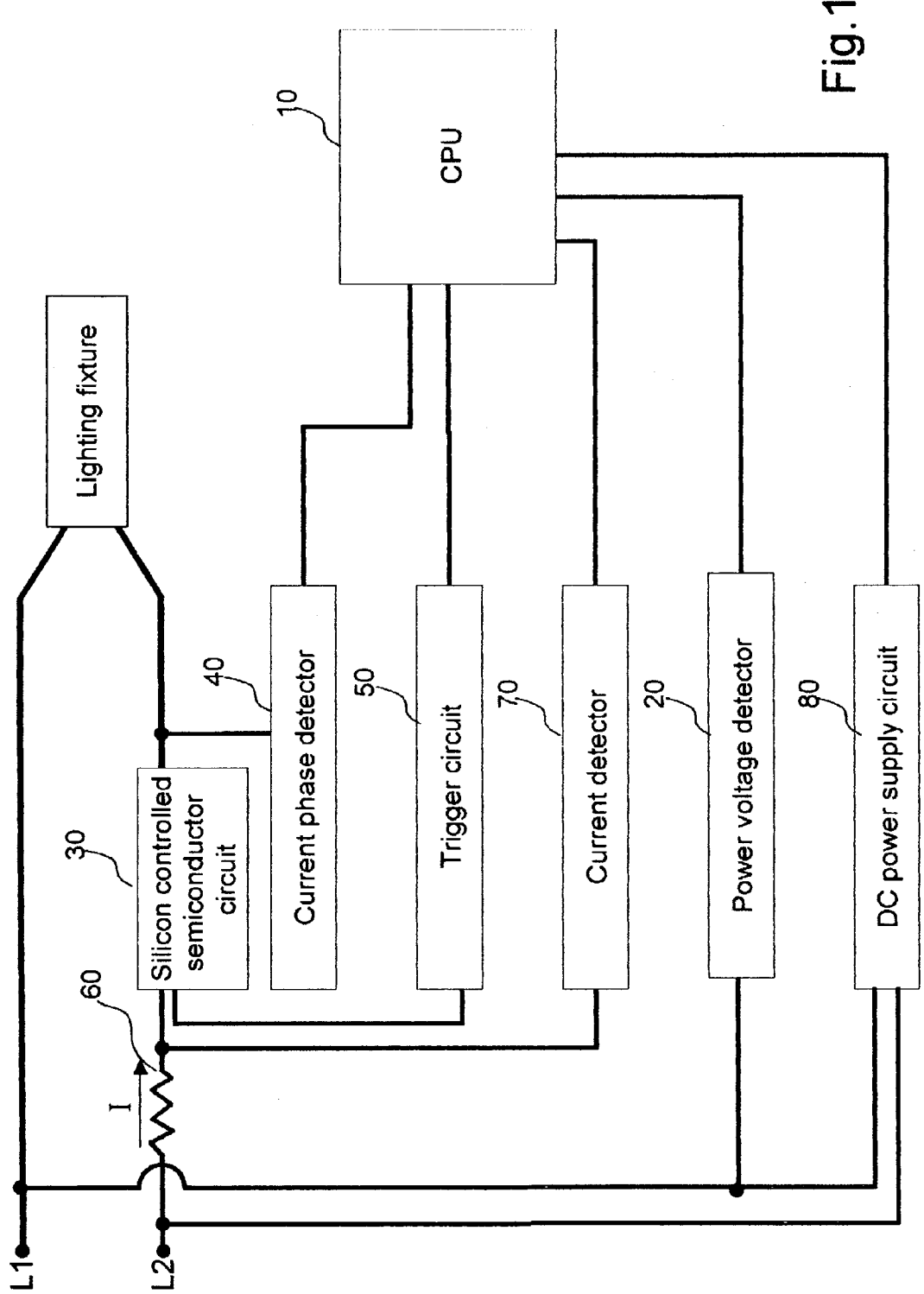
FIG. 1 is a circuit block diagram of the present invention.
Figure 2:
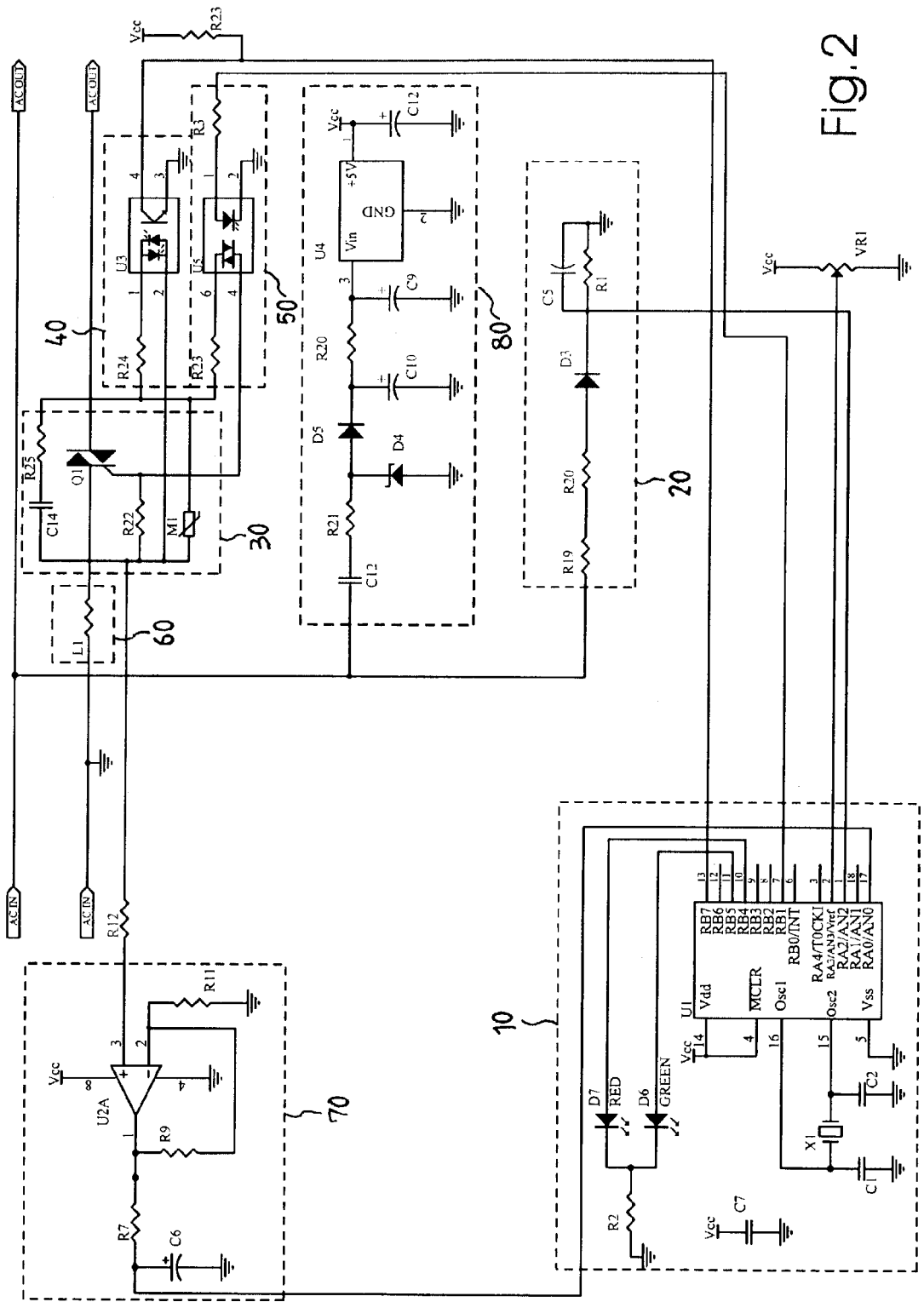
FIG. 2 is a detailed circuit diagram of the present invention.

Referring to FIGS. 1 and 2, an electronic power-saving power control circuit is designed to be connected between a single-phase power supply and a lighting fixture, comprised of a CPU 10, a power voltage detector 20, a silicon controlled semiconductor circuit 30, a current phase detector 40, a trigger circuit 50, a resistor 60, a current detector 70, and a DC power supply circuit 80.

The CPU 10 is the control center of the power-saving power control circuit. When received power voltage obtained by the power voltage detector 20, the CPU 10 electrically connects the silicon controlled semiconductor circuit 30 subject to the triggering angle required for the predetermined voltage drop and the time in which the current detected by the current phase detector 40 is zeroed, producing a power output.

The voltage detector 20 detects the voltage level of power supply, providing the information of detection result to the CPU 10.

The silicon controlled semiconductor circuit 30 is a circuit formed of a silicon controlled semiconductor and a protection circuit and connected in series between the single-phase power supply and the lighting fixture for working with the current phase detector 40 and the trigger circuit 50 to control power output.

The current phase detector 40 detects the time where the electric current passing through the silicon controlled semiconductor is zeroed, and provides the detection information to the CPU 10 for triggering the silicon controlled semiconductor.

The trigger circuit 50 is adapted to trigger the silicon controlled semiconductor circuit 30 for output of power supply subject to the control of the CPU 10.

The resistor 60 is electrically connected between the single-phase power supply and the lighting fixture, and adapted to cause a voltage drop upon passing of the electric current.

The current detection circuit 70 detects the value of the electric current passing through the resistor 60 subject to the voltage drop at the resistor 60 and, provides the measured current value to the CPU 10.

The DC power supply circuit 80 provides the whole circuit assembly with the necessary DC power.

The operation of the present invention is outlined hereinafter. When power supply turned on, the electronic power-saving power control circuit provides a full-voltage power output to the lighting fixture, causing the lighting fixture to be started. The electronic power-saving power control circuit runs a predetermined time delay for enabling the lighting fixture to be completely started before power saving function. Because the voltage at the load is reducing gradually only after the lighting fixture has been completely started (after the aforesaid predetermined time delay), the variation of brightness of the lighting fixture is not sharp. When the lighting fixture completely started, the voltage detector 20 detects the voltage level of power supply and then provides the information of detection result to the CPU 10, enabling the CPU 10 to turn on the silicon controlled semiconductor circuit 30 subject to the triggering angle required for the predetermined voltage drop and the time in which the current detected by the current phase detector 40 is zeroed, so that the silicon controlled semiconductor circuit 30 provides a suitable voltage output to the lighting fixture.

The design of the triggering software of the CPU must consider two factors. One factor is that there is no linearity between the range of voltage drop and the triggering angle. The other factor is that the maximum voltage drop must be defined so that the stability of the lightening of the lighting fixture can be maintained.

In addition to maintaining the stability of the lightening of the lighting fixture, the current detection circuit detects the level of the electric current subject to the voltage drop at the resistor, so that the CPU drives the silicon controlled semiconductor circuit to stop power supply from the lighting fixture when the level of the electric current detected by the current detection circuit surpassed the nominal current, achieving an overcurrent protection.

A prototype of electronic power-saving power control circuit has been constructed with the features of the annexed drawings of FIGS. 1 and 2. The electronic power-saving power control circuit functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. Art electronic power-saving power control circuit connected between a single-phase power supply and a lighting fixture for controlling the output of power supplied to the lighting fixture, comprised of a CPU (central processing unit), a power voltage detector, a silicon controlled semiconductor circuit, a current phase detector, a trigger circuit, a resistor, a current detector, and a DC power supply circuit, wherein:

said CPU is a control center of the power-saving power control circuit, and adapted to turn on said silicon controlled semiconductor circuit responsive to a triggering angle required for a predetermined voltage drop and a time in which an electric current detected by said current phase detector is zeroed when a power voltage from said power voltage detector is received, causing said silicon controlled semiconductor circuit to provide a power output to said lighting fixture, said CPU controlling said silicon controlled semiconductor circuit to first provide a full operating voltage to said lighting fixture for a time period established to ensure initiation thereof and then gradually reduce the operating voltage to avoid a sharp change in light output of said lighting fixture;

said voltage detector detects a voltage level of said single-phase power supply, providing a detection result to said CPU;

said silicon controlled semiconductor circuit is a circuit formed of a silicon controlled semiconductor and a protection circuit and connected in series between said single-phase power supply and said lighting fixture for working with said current phase detector and said trigger circuit to control power output to said lighting fixture;

said current phase detector detects the time where the electric current passing through said silicon controlled semiconductor is zeroed, and provides detection information to said CPU for triggering said silicon controlled semiconductor;

said trigger circuit is adapted to trigger said silicon controlled semiconductor circuit for output of power to said lighting fixture responsive to control by said CPU;

said resistor is electrically connected between said single-phase power supply and said lighting fixture, and adapted to cause a voltage drop responsive to passage of a load current therethrough;

said current detection circuit detects the value of a voltage drop across said resistor and provides a corresponding measured current value to said CPU.

2. The electronic power-saving power control circuit as claimed in claim 1, the relationship between said triggering angle and said voltage drop is not a linearity.

3. The electronic power-saving power control circuit as claimed in claim 1, wherein said triggering angle and said voltage drop are defined within a limited range subject to the nominal voltage and the features of said lighting fixture.

4. The electronic power-saving power control circuit as claimed in claim 1, wherein said current detection circuit detects the level of the electric current subject to the voltage drop at said resistor, so that said CPU drives said silicon controlled semiconductor circuit to stop power supply from said lighting fixture when the level of the electric current detected by said current detection circuit surpassed the nominal current, achieving an overcurrent protection.

\* \* \* \* \*